Aug. 26, 1941.                G. C. SOUTHWORTH                    2,253,589
             GENERATION AND TRANSMISSION OF HIGH FREQUENCY OSCILLATIONS
                              Filed Aug. 6, 1938
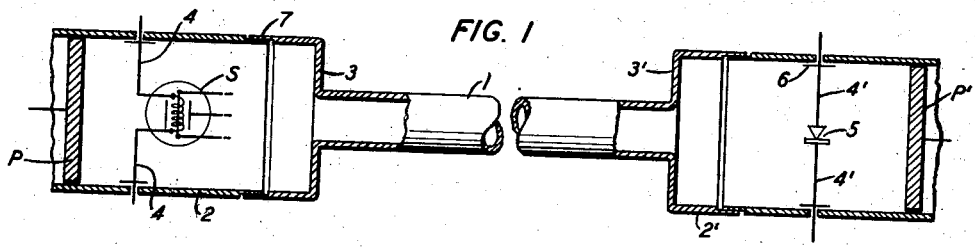
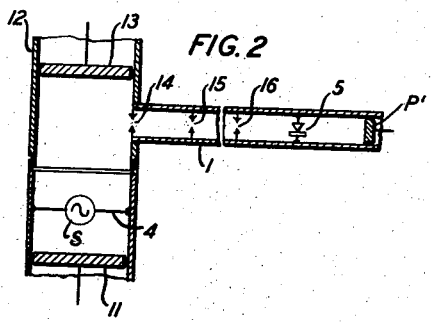
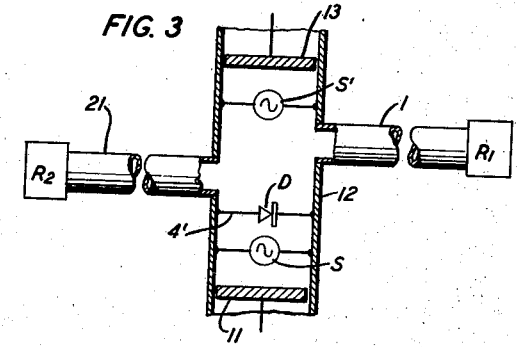
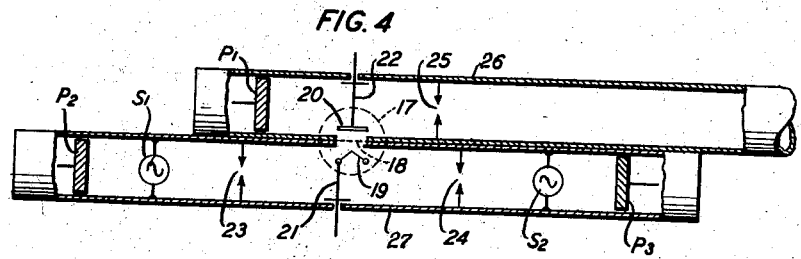
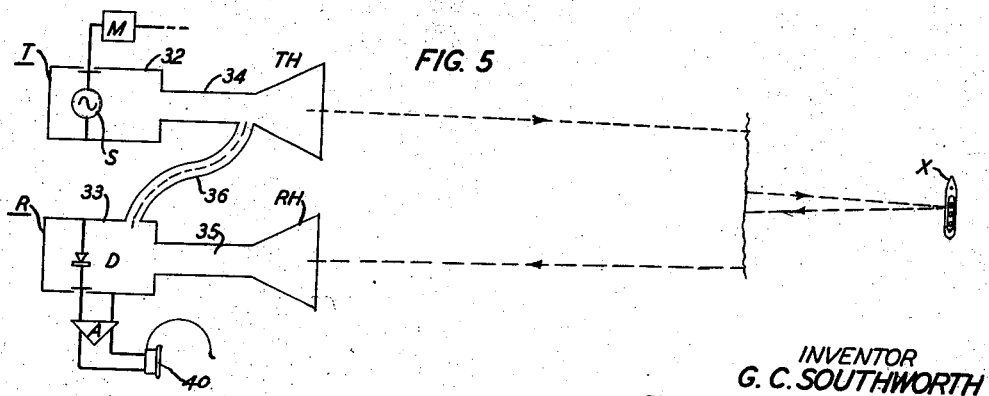
INVENTOR
G. C. SOUTHWORTH
BY
N. A. Ewing
ATTORNEY Patented Aug. 26, 1941

2,253,589

UNITED STATES PATENT OFFICE 2,253,589

GENERATION AND TRANSMISSION OF HIGH FREQUENCY OSCILLATIONS

George C. Southworth, Red Bank, N. J.

Application August 6, 1938, Serial No. 223,424

15 Claims. (Cl. 178—44)

This invention relates to the generation and application of ultra-high frequency oscillations, and more particularly to the generation and launching of waves appropriate for transmission through dielectric guides. The present application is in part a continuation of my application Serial No. 104,524, filed October 7, 1936, which issued April 11, 1939, as U. S. Patent No. 2,153,728.

An object of the invention is to provide an ultra-high frequency oscillation generator of high efficiency and power output. Another object is to increase the harmonic power output of a source of electromagnetic oscillations. The invention has for a more specific object an improvement in the efficiency, power output and other operating characteristics of a source of oscillations adapted for a system for the transmission of electromagnetic waves through dielectric guides of metallic pipe or other forms.

In accordance with preferred embodiments of the present invention, the foregoing objects are realized in an oscillation generator utilizing the transmission cut-off characteristics of a metallic pipe guide to inhibit the abstraction of power at a certain frequency or frequencies, as, for example, a fundamental frequency, and to enhance the power output at another frequency or other frequencies as, for example, frequencies harmonically related to a fundamental frequency. As a further feature of the invention, the phase velocity characteristics of a metallic pipe guide are utilized to select from various harmonics produced a particular desired harmonic.

Other objects, features and advantages will appear in the following detailed description of various embodiments of the invention. It is to be understood that these embodiments are only illustrative examples of practice and that the invention comprehends such other embodiments as come within the scope and spirit of the appended claims. In the accompanying drawing:

Figs. 1 and 2 illustrate embodiments of the invention employing oscillators adapted to generate oscillations of fundamental and harmonically related frequencies;

Figs. 3 and 4 illustrate other embodiments utilizing a non-linear device for the generation of modulation products and/or harmonics of applied waves; and Fig. 5 illustrates an application of the invention to a system for the detection and location of objects at a distance.

Heretofore I have shown how electromagnetic waves of suitable configuration and frequency can be propagated through a wave guide consisting of a metallic pipe and a dielectric medium, air, for example, enclosed thereby. In this connection reference may be had to my article and that of J. R. Carson et al. appearing in the April 1938 issue of the Bell System Technical Journal. It is there disclosed that there are a variety of different types of waves, each characterized by the spacial distribution of its component electric and magnetic fields, which can be sustained within a metallic pipe guide, and that for each type there is a more or less critical relation between the transverse dimensions of the guide, the dielectric coefficient of the medium within the pipe, and the frequency of the applied waves, which together define a transmission cut-off condition. More specifically, it is known that for a guide comprising a cylindrical metal pipe enclosing a gaseous dielectric medium, substantial propagation of any given type of wave takes place only if the product of the diameter of the guide and the frequency of the wave exceeds a certain value dependent on the type of wave. In the examples of my invention hereinafter to be described the guided waves are of the so-called asymmetric magnetic or $H_{11}$ type and the guides consist of cylindrical metallic pipes, although it will be apparent that the principles illustrated are equally applicable to systems utilizing waves and guides of other types.

Referring now to Fig. 1, my invention is shown in one form as embodied in a system for the transmission of energy from a station on the left through a dielectric guide 1 to a receiving station on the right. At the transmitting station the ultra-high frequency oscillation generating apparatus comprises a discharge device S and a metallically bounded oscillation chamber which encloses and completely shields it so that the only avenue of escape for the oscillatory power generated is the dielectric guide 1. The latter comprises a metallic pipe containing a dielectric medium, preferably gaseous, and at least a portion of it near the end is so restricted in cross-section that its cut-off frequency lies above the fundamental frequency of the oscillation generator. In consequence of the restriction in cross-section, oscillations of fundamental frequency cannot escape from the chamber and the only power abstracted from the generator, excepting for such power as is dissipated in the form of eddy currents and the like, is that which is caused to issue in the form of dielectrically guided waves suitable in frequency for transmission through the pipe guide 1. I have found that a restraint on the oscillation generator of the kind described is conducive to the enhanced production of power in the form of oscillations harmonically related to the fundamental frequency of the generator, and to greater over-all efficiency in the transformation of power from the primary source, batteries, for example, to such harmonic frequency waves.

The oscillation system illustrated in Fig. 1 comprises specifically a space discharge device S, of a kind adapted for operation as a Barkhausen-Kurtz oscillator, disposed within a chamber comprising a cylindrical metallic pipe 2 which at one end is closed by a longitudinally adjustable metallic piston P and which at the other end is connected by an annular metallic plate 3 to the end of the guide 1. The showing in Fig. 1 is schematic in that the construction of the discharge device, the means for its support, and the arrangement for applying operating potentials to the electrodes of the discharge device are not shown. Such details may be found in my Patent No. 2,106,771, issued February 1, 1938. The two terminals of the grid electrode are connected to means for launching dielectrically guided waves, that is, to the aligned radial conductors 4, which are appropriate for the $H_{11}$ wave chosen for illustrative purposes. The foundamental frequency generated by the oscillator is dependent on various factors including the operating potentials applied to its electrodes, and as is well understood in the art, the fundamental frequency can be varied over a certain range by a suitable adjustment of these potentials. The intensity of the oscillations of fundamental frequency, and to some extent the frequency, is affected by the length of the oscillation chamber and by the position of the launching means relative to the ends of the chamber. Piston P permits ready adjustment of the length of the chamber, and a telescopic joint 7 in pipe 2 enables adjustment of the relative position of the launching means to be made.

Assuming that the oscillator is adjusted to operate at a fundamental frequency $f$ and that the transmission cut-off frequency of the pipe guide 1 for the asymmetric magnetic waves launched from the conductors 4 lies above the frequency $f$, the electro magnetic field associated with the oscillations of fundamental frequency is largely confined to the chamber bounded by pipe 2, piston P and annular plate 3, so that the power abstracted from the oscillator at the fundamental frequency is comparatively small. The source S is a non-linear device of such nature, however, that it generates also oscillations harmonically related to the fundamental frequency $f$, and such of these harmonics as lie above the cut-off frequency of the guide 1 can be and are drawn off in the form of dielectrically guided waves in the guide. To increase the power output at some particular harmonic frequency, piston P is moved longitudinally and the distance between conductors 4 and end plate 3 varied concurrently until the most favorable position is found, even though either or both of these adjustments may result in a departure from optimum conditions for the generation of the fundamental frequency. Various mechanical expedients other than those shown for facilitating the several adjustments will be obvious to those skilled in the art.

In a specific embodiment in accordance with the principles hereinbefore set forth, applicant used a pipe 2 that was 12.5 centimeters in diameter, an air-filled pipe guide 1 that was 5 centimeters in diameter and a Barkhausen-Kurtz oscillator adapted to operate at a fundamental frequency of about 2300 megacycles per second. The cut-off frequency of the guide 1 was roughly 2400 megacycles per second, which is greater than the fundamental frequency but less than the 4600 megacycle second harmonic. Substantial amounts of power at the latter frequency were found in the guide 1 after adjustment of the respective longitudinal positions of the launching means and the piston P.

Thus far, nothing has been said about separation of the various harmonics that appear in the guide 1. For some applications of the invention such separation is unnecessary; for others, the discrimination afforded by the adjustment of piston P will suffice; but where greater discrimination is required it can be readily obtained, as by use of a filter or by use of a selective receiver of the kind shown in Fig. 1. The receiver structure is or may be the exact counterpart of the transmitting structure as indicated by the primed reference characters, except for the substitution of a rectifier 5 for the discharge device S. The radial leads 4' from the rectifier are extended through opposite openings in the pipe wall, covered by by-pass condenser plates 6, for connection to an external receiving circuit. By concurrent adjustment of the piston P' and of the distance between end wall 3' and leads 4', a combination can be found for which the receiver is selectively responsive to waves of any given frequency. The conductors 4' are to be so oriented as to be in alignment with the transverse electric field of the incident asymmetric magnetic waves.

The embodiment of the invention shown in Fig. 2 is quite similar to the Fig. 1 system although the wave guide 1 is connected laterally to the oscillator chamber and a filter in the guide is utilized to reject all harmonics except the one desired. The oscillation chamber comprises the metallic pipe 12 and metallic pistons 11 and 13. The discharge device S is disposed in the lower portion of the chamber with radial grid leads to the pipe wall as in Fig. 1, and the metallic pipe guide 1 branches from a lateral aperture in the upper portion. The aperture is provided with an adjustable iris diaphragm 14 which comprises with a like element 15 a filter capable of selecting any particular harmonic to the exclusion of others. The manner of operation and adjustment of the oscillator is the same as for Fig. 1 except that the position of the aperture along the chamber bounded by the two pistons may be adjusted to increase the power output at the desired harmonic frequency. This latter adjustment permits of an improved impedance match, at the desired frequency, between the pipe guide 1 and the oscillation chamber. The receiver may be of the kind shown in Fig. 1, or, as illustrated in Fig. 2, it may comprise an adjustable iris diaphragm 16, a rectifier 5 interposed in a diametral conductor and a reflecting piston P'.

In the embodiments of the invention described with reference to Figs. 1 and 2 the harmonics are derived directly from the primary source of ultra-high frequency oscillations. Figs. 3 and 4 are illustrative of another form of the invention in which means apart from the primary oscillation generator are utilized to produce the waves desired for application to the pipe guide 1. More particularly, wave distorting means excited by waves of fundamental frequency from one or more primary sources are utilized to derive waves of higher frequencies. Where exciting waves of only one frequency are applied to the distorting means, the waves produced by the distortion are harmonically related. Where exciting waves of a plurality of different frequencies are applied, there are developed not only harmonics of each frequency applied but a series of modulation products, any one of which can be selected for reinforcement in the oscillation chamber and for application to the load.

In Fig. 3 the oscillation chamber comprises a metallic pipe 12 and end pistons 11 and 13, and the discharge device S is interposed in a diametral lead, all as in Fig. 2. Branching laterally from the chamber is a metallic pipe guide 1, which terminates in a selective receiver $R_1$. The distorting means is shown as comprising a rectifier D interposed in a diametral conductor aligned with the grid leads of source S, although many other non-ohmic devices such as discharge tubes or a wire coated with thyrite can be used in lieu thereof. Supposing that the fundamental frequency of source S is $f$, then the various harmonics $2f$, $3f$, $4f$, etc. are developed in the chamber by the distorting device, and the relative positions of the two pistons, source S and the guide 1 can be so adjusted as to produce maximum power output at any one desired harmonic frequency.

Within the oscillation chamber of Fig. 3 another discharge device S' may be provided to generate oscillations of another fundamental frequency $f'$, so that various modulation products such as $f \pm f'$, $2f \pm f'$, $2f' \pm f$, etc. can be derived by the action of the distorting device D. A second metallic pipe guide 21 branching from another point along the chamber may also be provided, with its associated selective receiver $R_2$, so that power may be drawn off through the two pipe guides at different derived frequencies.

Fig. 4 illustrates a combination in accordance with the invention in which a special type of three-electrode discharge tube is utilized as a non-linear device for deriving harmonics and modulation products from one or more oscillatory sources. Two metallic pipe guides 26 and 27 are arranged in longitudinally overlapping relation and the discharge device 17 is disposed in an aperture in the common boundary. The grid element of the discharge device comprises a perforated metallic septum 18 which is disposed across the aperature so that the only dielectric connection between the interiors of the two pipes is through the grid perforations. Cathode 19 and anode 20 are on opposite sides of the grid and to them are connected respective diametral leads 21 and 22 which lead outside the pipe walls for connection to the external circuit, not shown. The external circuit comprises means for establishing a discharge between the cathode and the anode, and means for adjusting the device to operate along a non-linear portion of its voltage-current characteristic. The latter means may conveniently be adapted to provide a substantial negative bias on the grid relative to the cathode, although the non-linearity may be associated with either the grid circuit or the anode circuit, or both. Further details will be found in my application Serial No. 104,524, supra.

Upon the application of an alternating electromotive force of a given frequency to the cathode-grid circuit of the discharge device the potential of the anode 20 is caused to vary correspondingly at that frequency and also at frequencies harmonically related thereto. The anode lead 22 is adapted to give rise to corresponding dielectrically guided waves of asymmetric magnetic type in the pipe guide 26, and such of these waves as lie above the cut-off frequency of the guide are accordingly transmitted and may be used for any suitable purpose, as, for example, for communication with a distant receiving station as in Fig. 1.

In accordance with the invention, the diameter of the guide 26 is so restricted that the cut-off frequency lies above the fundamental frequency applied to the harmonic generator and preferably between the frequency of some particular desired harmonic and the next lower harmonic. In this manner more of the applied fundamental frequency power is translated into harmonic frequency power.

A piston $P_1$ in the guide 26 is to be adjusted to such distance from the launching conductor 22 that the harmonic power transmitted in the opposite direction is maximum. On the other side of the discharge device there may be interposed an iris diaphragm 25 which is adjustable as to aperture and position along the guide 26. Properly adjusted, it serves to discriminate in favor of the desired harmonic wave and to confine the power associated with other harmonics, as well as the fundamental, to the chamber bounded by it and piston $P_1$. Further enhancement of the power output at the desired harmonic frequency is thus secured. When piston and iris diaphragm are properly correlated, the length of the chamber bounded by them bears an approximate simple relation to the length of the desired harmonic wave within the guide and it is generally about a half wave-length or multiple thereof. In view of the fact that the velocity of propagation in the guide is not independent of frequency but is a non-linear function thereof, it is unlikely that the length of the chamber that is optimum for the desired harmonic will be optimum also for any other harmonic. If in any particular case, however, it is found that there is an excessive amount of spurious harmonic power, another iris diaphragm can be added to form a band-pass filter tuned to the desired frequency.

Turning attention now to the input side of the harmonic generator, the fundamental frequency source is shown as comprising a discharge device $S_1$ and associated piston $P_2$ in the wave guide 27. The discharge device may be of the kind indicated in Fig. 1 and similarly adapted to oscillate and to launch corresponding asymmetric magnetic waves in the guide 27. These waves are received at the discharge device 17 and introduce the required alternating electromotive force of fundamental frequency in the cathode-grid circuit thereof. For impedance matching purposes the latter circuit may be enclosed in a resonant chamber bounded on the one side by an adjustable iris diaphragm 23 and on the other by a reflecting piston. The latter is not shown but an iris diaphragm 24 serves in its stead. Diaphragm 24 is adapted also to admit to the chamber waves from another oscillation source, comprising piston $P_3$ and discharge device $S_2$, which may be identical with the one at the other end of guide 27 except for frequency of operation.

Supposing that the two sources are adapted to operate at mutually different frequencies, $f_1$ and $f_2$, there will be produced in the anode circuit of the harmonic generator not only the harmonics of these two frequencies but various modulation products as well. If, for example, $f_1$ is 1750 megacycles and $f_2$ is 2000 megacycles, one such modulation product is $f_1+f_2$ or 3750 megacycles, and it may be selected for transmission through the guide 26 by following the principles and procedure outlined hereinbefore.

It is to be understood that the frequencies represented by $f_1$ and $f_2$ may either or both be single frequencies or bands of frequencies. Thus the one might be a single or carrier frequency and the other a band of frequencies with which the carrier is to be modulated. Likewise it will be understood that the waves selected for transmission through the outgoing pipe guide may be modulated with telephone, television or other signals without essentially affecting the efficient production of such waves.

In Fig. 5 is shown an adaptation of the invention to a system for detecting the presence of objects at a distance, for determining the angular bearing of such objects, and for measuring the distance thereof. The object may be, for example, a ship at sea, or an aircraft in flight, or where the apparatus is carried on an aircraft, the object may be the surface of the earth or mountains in the path of flight. The apparatus comprises means for launching an ultra-high frequency wave in the direction of the object and highly directive receiving means for picking up the wave reflected from the object, together with means for comparing the transmitted wave and the received wave for the purposes described.

The wave launching means T may comprise, as illustrated, a harmonic frequency oscillation generator comprising a source S and chamber 32 as illustrated in Fig. 1, a pipe guide 34 of restricted diameter leading from the chamber and terminated in a directive horn TH of the kind disclosed in an application of A. P. King, Serial No. 204,960, filed April 29, 1938. The wave receiving means R may comprise a selective receiver of the kind shown in Fig. 1, including a tuned receiving chamber 33, a pipe guide 35 of restricted diameter leading thereto, and a directive horn RH mounted at the end of the guide. As a specific example, it may be supposed that the waves used are of 10 centimeters length and that the two horns each have a conical angle of about 50 degrees. Transmitting and receiving units may be mounted on a rotatable cross-bar so as to be synchronously moved to scan the field in which the presence of an object is suspected, but the mechanical mounting, whatever it may be, is preferably such that no substantial amount of power is permitted to travel from the horn TH to the horn RH except by reflection from the distant object X. It is evident that as the transmitter and receiver are moved to scan the field, a position will be reached where the waves reflected from the object X or from some part thereof will be directed along the axis of the receiving horn RH so as to affect the receiving apparatus. In order that the presence of the received wave may be detected a tone source M, say of 10,000 cycles, may be used to modulate the transmitted wave, and an amplifier A and telephone receiver 40 may be used at the receiver as an aural detector.

To determine other information about the object besides its presence and bearing, a direct wave path is established between the transmitter and receiver for comparison purposes. This path may comprise, as illustrated, a coaxial line 36 which at one end is connected to the guide 34 in such manner as to pick up a small amount of the transmitted wave power and which at the other end is connected into the receiving chamber. The amount of power thus delivered from the transmitter to the receiver may be controlled by adjusting the length of the inner conductor of the coaxial line that extends into the guide 34 and into the receiver 33. Alternatively, a dielectric guide may be utilized for this purpose or a certain amount of leakage may be permitted to take place between the transmitting horn and the receiving horn. In any of these cases, the local path provides in the receiver R a reference wave which may be used for comparison with the received reflected wave. Preferably the reference wave is adjusted in amplitude so that it is about equal in intensity to the received wave. Now if the object is moving toward or away from the detecting apparatus a flutter or cyclical variation in the intensity of the tone in the telephone receiver will be noted. If the receiving apparatus is given an acceleration toward the object and the frequency of the flutter increases it may be concluded that the object is moving toward the apparatus, which will be verified if the flutter frequency is reduced when the apparatus is accelerated in the other direction. If upon accelerating the apparatus toward the object it is found that the frequency of flutter first decreases then increases, it may be concluded that the object is receding and that the velocity of the apparatus at which the flutter frequency is zero is the speed of the object. It is obvious, of course, that a reversal of this procedure will determine the speed of objects moving in the opposite direction.

For determining the distance from the locator to the object it is desirable that the modulating frequency be adjustable. If then the transmitted wave is modulated with a frequency correlated to a free space wave-length equal to four times the distance to the object, interference with the local signal in the receiver will be complete, and the modulating frequency is then a measure of the distance to the object. For the purposes of measuring this distance to the object, the modulating frequency should be the lowest for which complete interference is obtained.

What is claimed is:

1. An ultra-high frequency oscillation generator comprising a non-linear device, means for exciting said device to produce oscillations of harmonically related frequencies, metallic means forming an enclosure for confining the said oscillations produced, and a hollow metallic pipe guide communicating with the interior of said enclosure and adapted for the withdrawal of oscillatory wave power generated therein, said guide having a high-pass transmission cut-off frequency that lies above at least the lowermost of said harmonically related frequencies, whereby the oscillatory power load on said generator at said lowermost frequency is minimized and the oscillatry power output at one or more frequencies above said cut-off frequency is substantially enhanced.

2. An ultra-high frequency oscillation generator comprising a non-linear device, the output of which includes oscillations of a plurality of different frequencies, metallic means enclosing said generator, and a dielectric guide comprising a metallic pipe leading away from the enclosing means for withdrawing energy from said generator, the cut-off frequency of said dielectric guide being greater than the lowermost of said plurality of frequencies.

3. An ultra-high frequency oscillation generator, the output of which includes oscillations of a fundamental and harmonically related frequencies, a metallic chamber enclosing said generator, and means for withdrawing energy from said generator only at a frequency lying above the said fundamental frequency, said means comprising a metallic pipe leading from said chamber, said pipe having transverse dimensions too small to support transmission of dielectrically guided waves of said fundamental frequency.

4. In combination, a wave guide comprising a metallic pipe, an oscillation generator adapted to produce oscillations of a fundamental frequency and of frequencies harmonically related thereto, said oscillation generator being adapted to establish dielectrically guided waves in said pipe, and means shielding said generator against loss of power by radiation, said pipe being of such transverse dimensions that its cut-off frequency lies above said fundamental frequency, whereby there is substantial withdrawal of power from said generator only at one or more of said harmonic frequencies.

5. An ultra-high frequency oscillation generator, the output of which includes a fundamental frequency and harmonics thereof, metallic means enclosing said generator to confine oscillations of fundamental frequency to the immediate vicinity of said generator, and a metallically bounded wave guide connected to said enclosing means for withdrawing only oscillations of harmonic frequency.

6. In combination, a high frequency oscillator, means metallically enclosing said oscillator and completely shielding it against loss of oscillatory power by radiation, a metallic pipe connected with the enclosing means for withdrawing power from said oscillator in the form of dielectrically guided waves, said pipe having a transmission cut-off frequency that lies between a desired harmonic frequency of said oscillator and the next lower frequency thereof, and means for selectively applying said desired harmonic to a useful load.

7. In combination, a metallically bounded chamber, a metallic pipe guide leading from said chamber, means within said chamber for launching dielectrically guided waves for transmission through said pipe guide, and a source of harmonically related oscillations arranged to deliver power substantially exclusively to said launching means, said pipe guide having such transverse dimensions that transmission of guided waves at the lowermost of said oscillations is suppressed.

8. In combination, a metal-walled pipe-like chamber, a wave guide consisting essentially of a metallic pipe leading from said chamber, an ultra-high frequency oscillation generator having power input means and power output means, said generator having at least said power output means disposed within said chamber for launching dielectrically guided waves in said guide, and the said guide having a cut-off frequency lying above at least the lowest frequency produced by said generator.

9. In combination, a wave guide comprising a metallic pipe, means within said pipe for launching dielectrically guided waves therein, an ultra-high frequency oscillation generator the output of which includes a fundamental frequency and harmonics thereof, said generator having output means within said pipe for energizing said launching means, the transverse dimensions of said guide being so restricted that oscillations of said fundamental frequency are confined to the immediate vicinity of said launching means but large enough that at least one of said harmonic frequencies is transmitted.

10. A space discharge device comprising a generator of multi-frequency electrical waves, said generator having power input means and high frequency power output means, and a metallic structure enclosing said output means for selectively transmitting from said output means only such waves as lie above a predetermined frequency, whereby a larger proportion of the power delivered to said input means is recovered in the form of said last-mentioned wave.

11. In combination, a non-linear device, metallic means enclosing at least a portiton of said device, a metallic pipe guide leading from said enclosing means, a source of oscillations of a certain frequency, and means for applying said oscillations to said device whereby oscillations of harmonic frequencies are generated, means comprising said device adapted to launch dielectrically guided waves corresponding to said last-mentioned oscillations, and means comprising said pipe inhibiting the abstraction of wave power from said last-mentioned means except at frequencies exceeding said certain frequency.

12. In combination, a wave guide comprising a metallic pipe, said pipe having an opening in the wall thereof and a discharge device disposed in said opening, said discharge device comprising a grid electrode across said opening, an anode within said pipe and a cathode outside said pipe, means cooperating with said anode to launch dielectrically guided waves in said pipe, a source of oscillations of a certain frequency below the cut-off frequency of said pipe, and means for applying said oscillations to the cathode and grid of said discharge device to generate harmonic oscillations lying above said cut-off frequency.

13. In combination, two metallic pipe guides in longitudinally overlapping relation with a common lateral wall between them having an opening therein, a discharge device disposed in said opening, said device having a grid electrode substantially covering said opening, a cathode in one of said guides and an anode in the other, means for applying to said grid electrode and said anode normal operating potentials such that the device has a non-linear applied voltage-output current characteristic, means for launching unmodulated dielectrically guided waves in said one guide and means cooperating with said cathode for applying said waves to said discharge device, and means cooperating with said anode for launching dielectrically guided waves in said other guide, said other guide having a cut-off frequency higher than the frequency of said unmodulated waves, whereby a substantial proportion of the power applied to said device is derived in the form of guided waves of harmonic frequency.

14. In combination, a metal-walled chamber, a pipe guide of restricted diameter leading from said chamber, and means within the chamber for generating oscillations of a fundamental and harmonically related frequency comprising an oscillator of a type such that the fundamental frequency is a function of the length of the chamber, the cut-off frequency of said guide being higher than said fundamental frequency.

15. A combination in accordance with claim 14 comprising a non-linear device excited by said waves of fundamental frequency for generating said harmonics.

GEORGE C. SOUTHWORTH.